(12) United States Patent
Kim et al.

(10) Patent No.: US 7,908,962 B2
(45) Date of Patent: Mar. 22, 2011

(54) COMPRESSOR

(75) Inventors: Hyun Kim, Changwon-si (KR); Ji Young Bae, Busan-si (KR); Chul Gi Roh, Changwon-si (KR); Chang Yong Jang, Gwangju-si (KR); Jong Min Sin, Busan-si (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 10/584,465

(22) PCT Filed: Dec. 24, 2003

(86) PCT No.: PCT/KR03/02839
§ 371 (c)(1),
(2), (4) Date: Aug. 13, 2007

(87) PCT Pub. No.: WO2005/061893
PCT Pub. Date: Jul. 7, 2005

(65) Prior Publication Data
US 2008/0022850 A1    Jan. 31, 2008

(51) Int. Cl.
*F16J 1/10* (2006.01)

(52) U.S. Cl. .......................................................... 92/84
(58) Field of Classification Search ....................... 92/84
See application file for complete search history.

(56) References Cited

U.S. PATENT DOCUMENTS

| | | | | |
|---|---|---|---|---|
| 1,738,786 | A | * | 12/1929 | McKinley .......................... 92/94 |
| 2,372,472 | A | | 11/1943 | Campbell |
| 3,659,502 | A | | 5/1972 | Friedman et al. .................. 92/84 |
| 4,527,463 | A | * | 7/1985 | Albarda ............................ 92/84 |
| 6,595,105 | B2 | | 7/2003 | An et al. ........................... 92/60 |

FOREIGN PATENT DOCUMENTS

| | | |
|---|---|---|
| DE | 2734447 | 2/1979 |
| KR | 2002-0029549 | 4/2002 |
| KR | 10-2003-0071336 | 9/2003 |
| WO | WO 00/08325 | 2/2000 |

\* cited by examiner

*Primary Examiner* — F. Daniel Lopez
(74) *Attorney, Agent, or Firm* — Ked & Associates LLP

(57) ABSTRACT

A compressor is provided that includes a supplementary torque providing part that reduces a speed of a piston compression of refrigerant and increases the speed of the piston in drawing of the refrigerant. This structure reduces a compression rate of the refrigerant in compression relatively, and increases a re-expansion rate, to maximize suction efficiency.

14 Claims, 16 Drawing Sheets

COMPRESSOR

BACKGROUND OF THE INVENTION

1. Field of the Invention

The present invention relates to compressors, and more particularly, to a reciprocating type compressor, in which a compression rate of refrigerant is reduced relatively, a re-expansion rate is increased, for maximizing a suction efficiency.

2. Description of Related Art

In general, the compressor receives a working fluid from an evaporative heat exchanger, compresses, and supplies the working fluid to a condensing heat exchanger. FIG. 1 illustrates a related art reciprocating type compressor that compresses a gas inside of a cylinder by means of reciprocating motion of a piston connected to a connecting rod, which will be described.

The reciprocating type compressor is provided with a case 10, an electric driving part 20, and a compression part 30. The case 10 has an upper shell 12 and a lower shell 11, joined together to enclose an inside space of the case 10. There is refrigerating machine oil held in a lower part of an inside of the lower shell 11 to an appropriate depth for preventing wear of various machine components. The electric driving part 20 has a stator 21 for receiving a current to generate an electro-magnetic force, and a rotor 22 for generating a rotating force by the electro-magnetic force from the stator 21.

The compression part 30, compressing the working fluid by the rotating force from the electric driving part 20, has a crank shaft 31, an eccentric part 32, a connecting rod 33, and a piston 34. The crank shaft 31 press fits in the rotor 22, to rotate with the rotor 22, and has a lower end submerged in the refrigerating machine oil in the lower shell 11. The eccentric part 32 is provided to an upper end of the crank shaft 31, eccentric from a shaft axis of the crank shaft 31. The connecting rod 33 has one end coupled to the eccentric part 32 on the upper end of the crank shaft 31 with a pin, and the other end coupled to the piston 34 with a pin, for converting rotating motion of the crank shaft 31 into a linear reciprocating motion. The piston 34 compresses the working fluid in a cylinder block 35 with a connecting rod 33.

FIG. 2 illustrates a configuration of connection between the cylinder block 35, the piston 34, the connecting rod 33, and the crank shaft 31, schematically.

When a power is applied to the reciprocating type compressor, the rotor 22 rotates owing to formation of a magnetic field caused by an electric force, and the crank shaft 31 rotates as the rotor 22 rotates. According to this, the connecting rod 33, connected to the eccentric part 32 of the crank shaft 31, swings in left/right directions repeatedly when the drawing is seen from above by a predetermined torque, so that the piston 34 reciprocates in the cylinder block 35 linearly, to draw, compress, and discharge the refrigerant repeatedly, according to valve actions of a suction valve, and a discharge valve.

However, the related art reciprocating type compressor can not, but be involved in over compression due to a generally fast compression rate in compressing the refrigerant. Of course, the rotation speed of the rotor 22 may be reduced for solving the problem, however, when the suction rate of the refrigerant becomes slow, to cause difficulty in drawing the refrigerant. Particularly, even though a greater torque from the electric driving part 20 is required at a top dead center as far as there is no time delay at the top dead center, the greater torque in turn requires a larger electric driving part 20.

Moreover, the compression and re-expansion within a half cycle in the case of the related art reciprocating type compressor causes a great variation of the torque, to require a larger electric driving part 20 in comparison to rated output or affect the suction efficiency.

SUMMARY OF THE INVENTION

An object of the present invention designed to solve the foregoing related art problems lies on providing a compressor which enables relatively slow compression, and relatively fast suction of refrigerant for improving a suction efficiency, and reducing a torque of the electric driving part.

To achieve the object of the present invention, there is provided a compressor including a cylinder block for compressing, discharging, and drawing refrigerant, a piston for reciprocating inside of the cylinder block, a crank shaft for rotating as the crank shaft receives a torque from an electric driving part, and having an eccentric part at an end thereof, a connecting rod having one end coupled to the piston, and the other end coupled to the eccentric part at the crank shaft for converting rotating movement of the crank shaft into a linear movement to move the piston, and a supplementary torque providing part for reducing a speed of the piston in compression of the refrigerant, and accelerates a speed of the piston in drawing the refrigerant.

The supplementary torque providing part is positioned such that compression, extension, and restoration of the supplementary torque providing part are made along a direction of movement of the piston.

The piston includes a first piston and a second piston, and the supplementary torque providing part includes a second elastic member between the first, and second pistons, with both ends thereof connected to the first and second pistons, for being compressed when the refrigerant is compressed, and being restored when the refrigerant is drawn.

The connecting rod includes a first connecting part connected to the piston, and a second connecting part connected to the eccentric part at the crank shaft, and the supplementary torque providing part includes at least one third elastic member between the first connecting part and the second connecting part of the connecting rod, having both ends connected to the first connecting part and the second connecting part respectively.

The connecting rod includes a first connecting part connected to the piston, and a second connecting part connected to the eccentric part at the crank shaft, and the supplementary torque providing part includes a fourth elastic member between the first connecting part and the second connecting part, and having opposite ends connected to the first connecting part and the second connecting part respectively, to form an outer circumferential surface, and a fifth elastic member fitted inside of the fourth elastic member.

DESCRIPTION OF DRAWINGS

The accompanying drawings, which are included to provide a further understanding of the invention, illustrate embodiment(s) of the invention and together with the description serve to explain the principle of the invention.

In the drawings.

DETAILED DESCRIPTION

Figure 1:
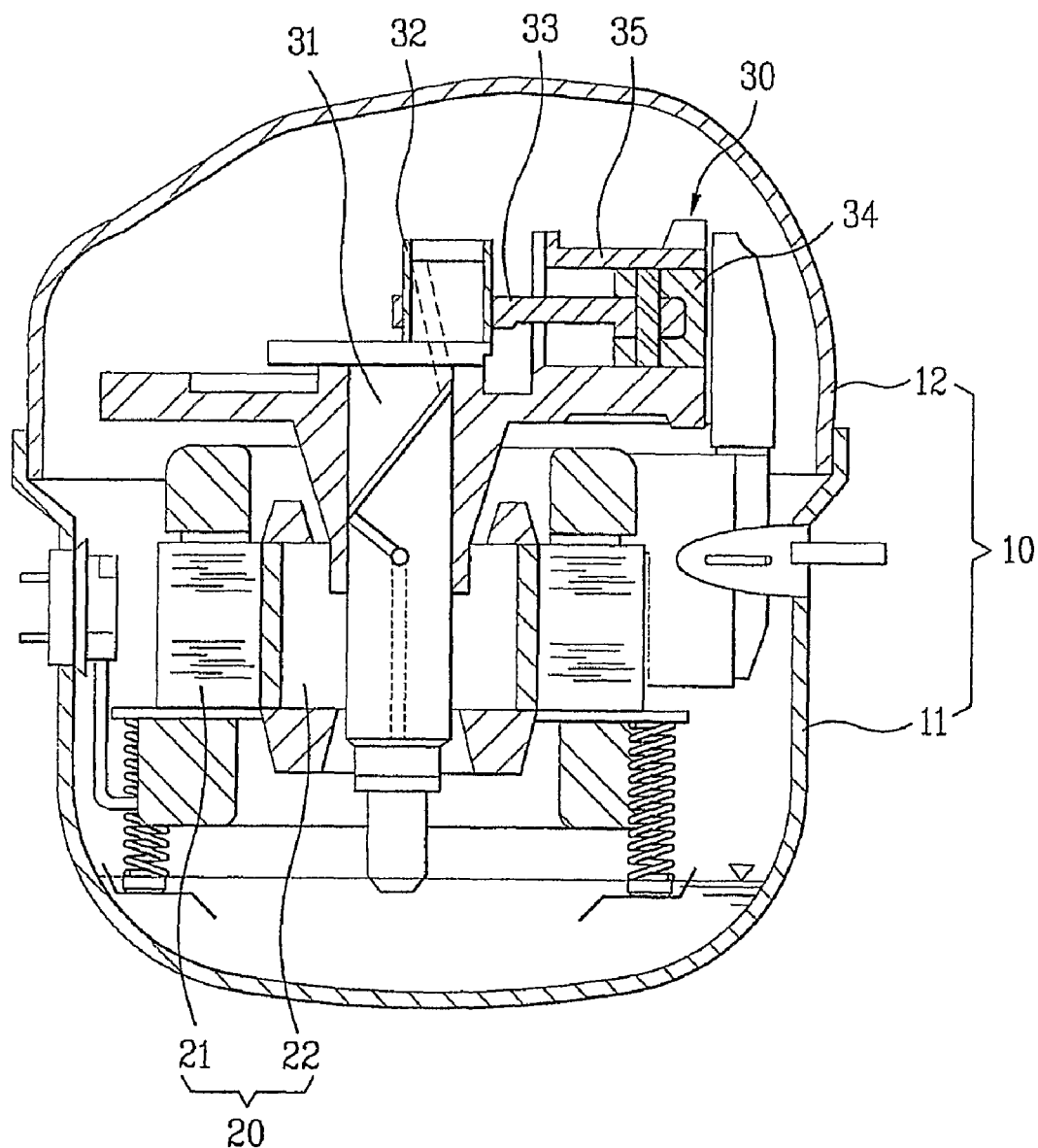
FIG. 1 illustrates a section of a related art reciprocating type compressor.
Figure 2:
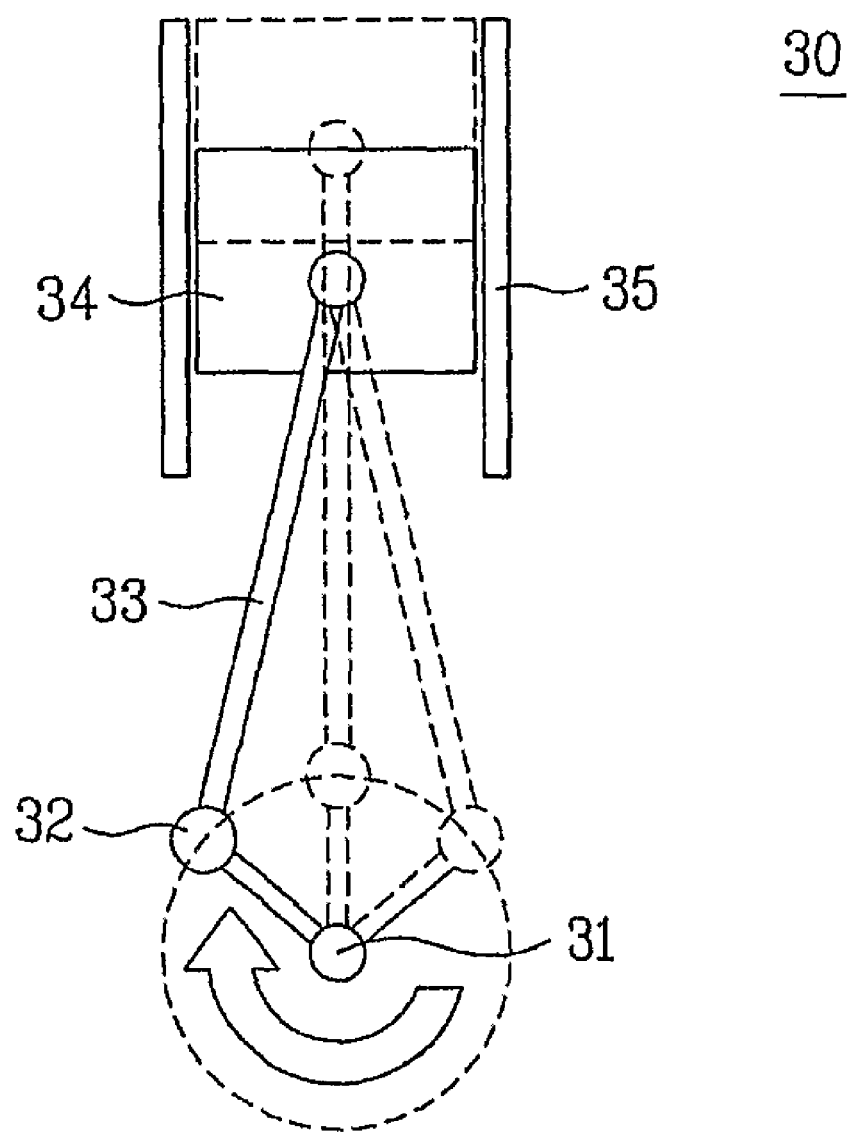
FIG. 2 illustrates a diagram of a configuration of connection between a cylinder block, a piston, a connecting rod, and a crank shaft in a related art compressor, schematically.

Reference will now be made in detail to the preferred embodiments of the present invention, examples of which are illustrated in the accompanying drawings.

To start with, the compressor of the present invention includes a cylinder block 350, a piston 340, a crank shaft 310, a connecting rod 330, and a supplementary torque providing part.

In the cylinder block 350, refrigerant is compressed, discharged, and drawn. The piston 340 reciprocates inside of the cylinder block 350, to compress or draw the refrigerant. The crank shaft 310 rotates as the crank shaft receives a torque from the electric driving part 20 having a stator 21 and a rotor 22, and has an eccentric part 320 at an end thereof. The eccentric part 320, eccentric from an axis of the crank shaft 310, rotates eccentric from an axis of rotation of the crank shaft 310. The connecting rod 330 has one end coupled to the piston 340 to be rotatable in left/right directions, and the other end coupled to the eccentric part 320 to be rotatable in left/right directions. Both ends of the connecting rod 330 have through holes with a coupling shaft 341 formed on the piston 340 and the eccentric part 320 inserted therein, respectively. The supplementary torque providing part slows down a speed of the piston 340 in compression of the refrigerant, and accelerates a speed of the piston 340 in drawing the refrigerant. Mounting positions and configurations of the supplementary torque providing parts will be described for each embodiment.

Figure 3A:
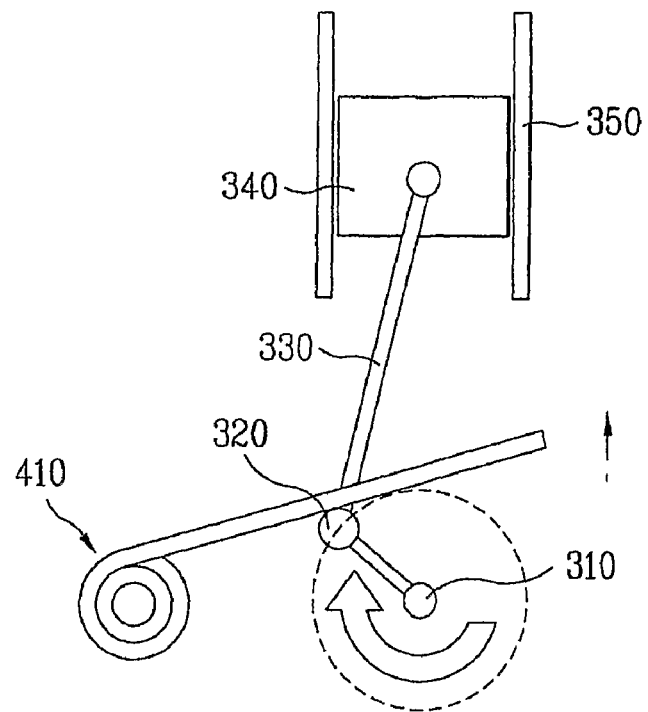
FIGS. 3A~3C illustrate diagrams showing the steps of operation of a structure in accordance with a first preferred embodiment of the present invention, schematically.
Figure 3B:
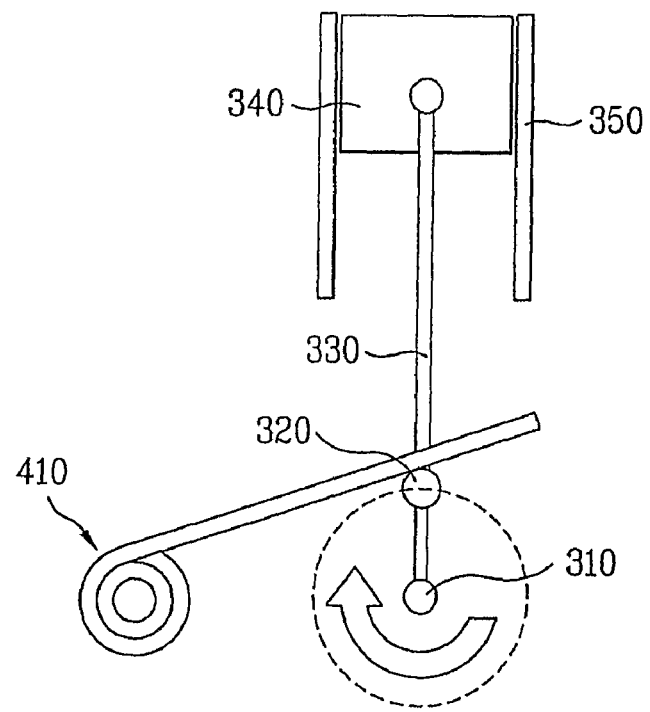
Figure 3C:
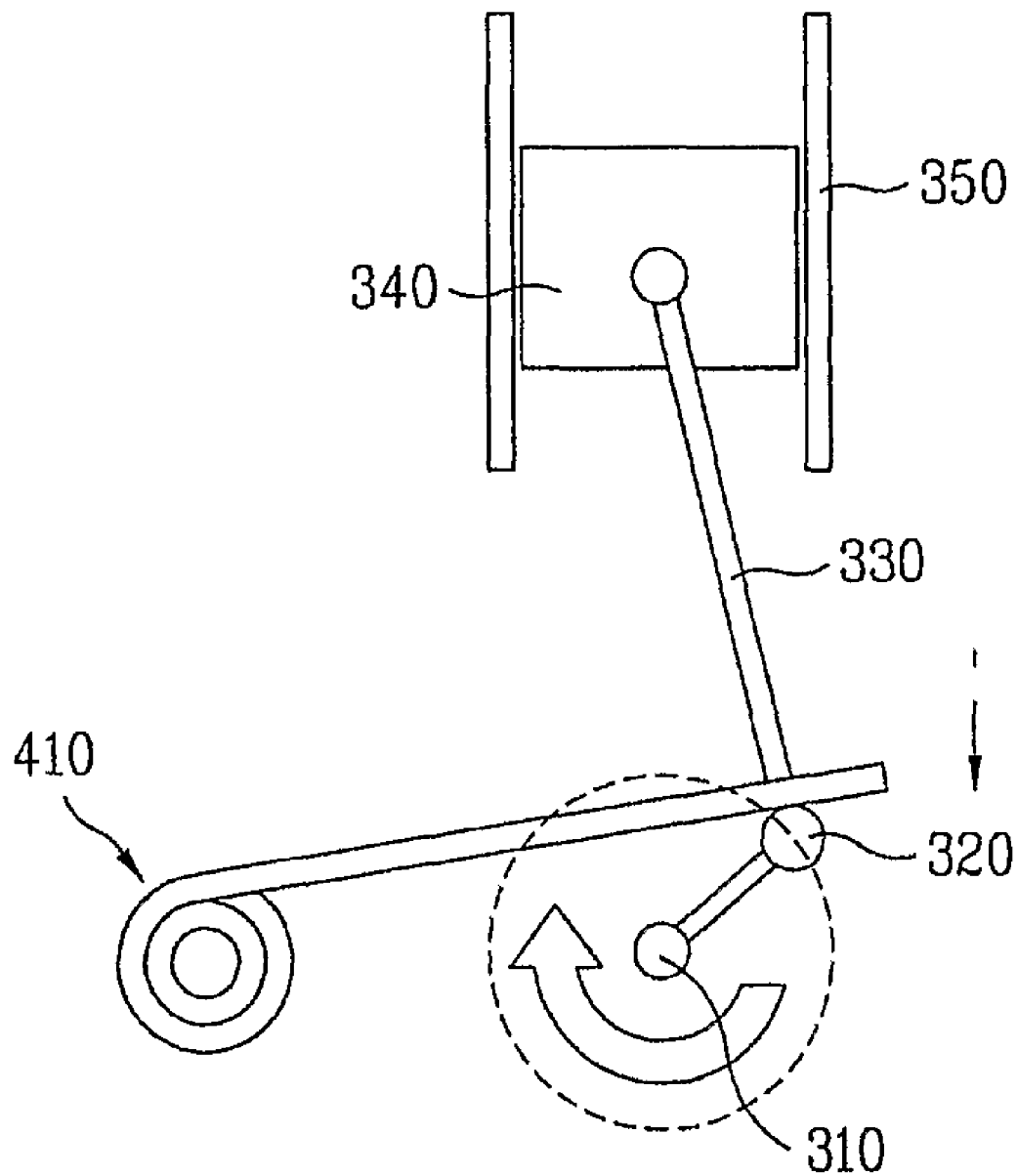

Referring to FIGS. 3A~3C, a first embodiment suggests positioning of the supplementary torque providing part such that compression and restoration of the supplementary torque providing part are made along a direction of movement of the piston 340.

For this, the supplementary torque providing part includes a first elastic member 410 having one end fixed to one stationary part inside of the compressor, and the other end in contact with the eccentric part 320 for extending or contracting along a moving direction of the piston 340 in compression of the refrigerant to increase a level of torque storage therein.

That is, the first elastic member 410 is a plate spring in contact with an outside circumferential surface of the eccentric part 320 so that the first elastic member 410 provides a restoration force to the eccentric part 320 in a direction opposite to the moving direction of the piston 340 in compression of the refrigerant, and, particularly, the first elastic member 410 reaches to a state in which the first elastic member 410 is extended to maximum in a case the piston reaches to a top dead center.

Figure 4:
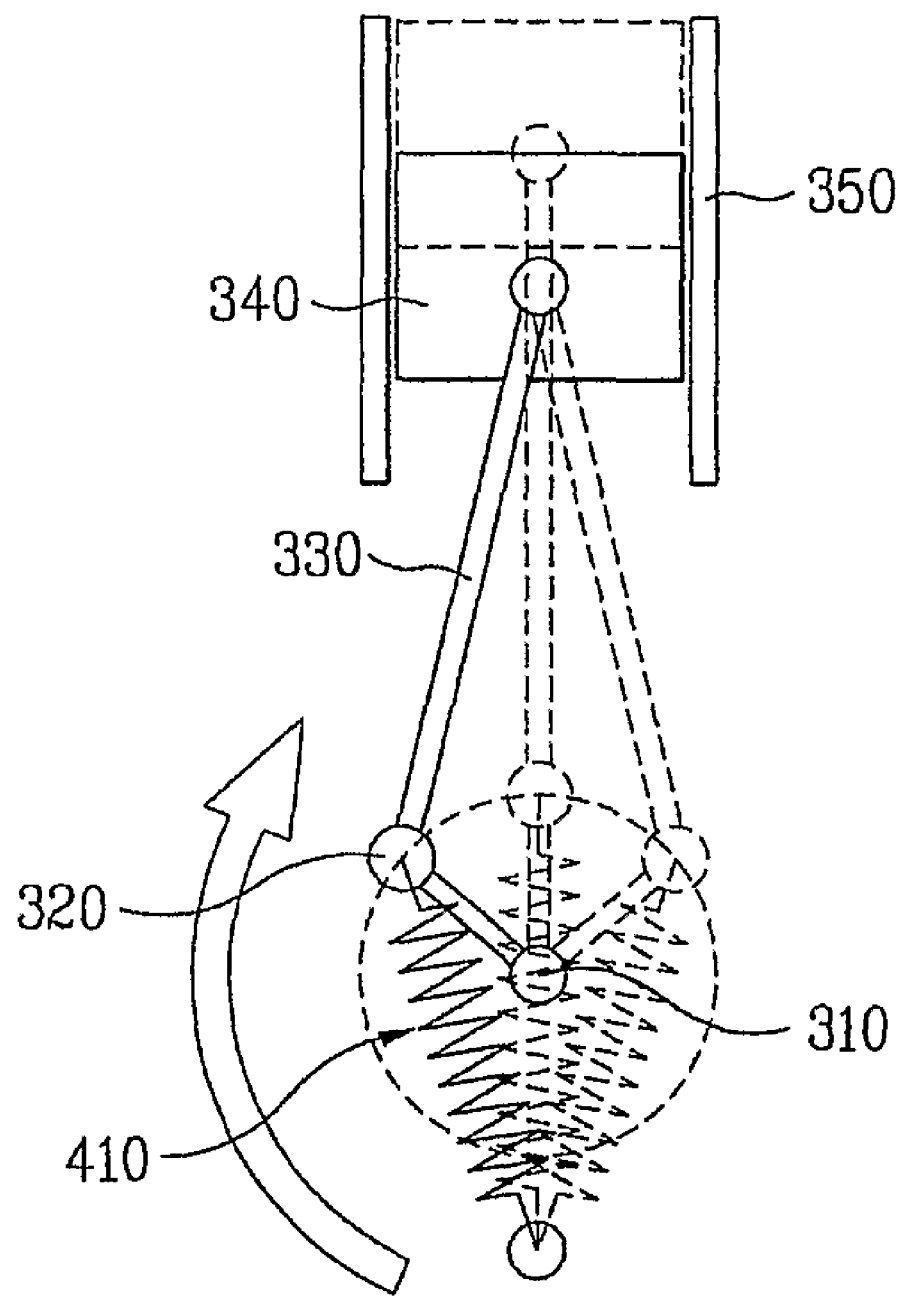
FIG. 4 illustrates a diagram showing another example of application of a first elastic member in accordance with a first preferred embodiment of the present invention.

Of course, referring to FIG. 4, the first elastic member 410 may be a coil type compression spring in contact with the outside circumferential surface of the eccentric part 320 for providing a restoring force to the eccentric part 320 in a direction opposite to the moving direction of the piston 340 in compression of the refrigerant, such that the coil type compression spring reaches to a state in which the coil type compression spring is compressed to the maximum in a case the piston reaches to the top dead center.

The operation of the first embodiment compressor will be described in more detail referring to FIGS. 3A~3C, which illustrate the steps of operation of the first embodiment compressor.

When power is applied to the compressor for operation of the compressor, the rotor 22 rotates together with the crank shaft 310. Then, the eccentric part 320 at the end of the crank shaft 310 eccentric therefrom revolves round the axis of the crank shaft 310, to make the connecting rod 330 to reciprocate.

According to this, the piston 340 reciprocates inside of the cylinder block 350, to repeat a series of process in which the refrigerant is drawn into the cylinder block 350, compressed, and discharged.

In above process, referring to FIG. 3A, for compressing the refrigerant introduced thereto, if the piston 340 moves upward from a lowest position little by little, i.e., the eccentric part 320 moves upward little by little together with rotation of the crank shaft 310, the first elastic member 410, in contact with an upper surface of the eccentric part 320, has the other end lifted with reference to one fixed end little by little, and stores torque.

In this instance, even though the eccentric part 320 is revolved by the rotation of the crank shaft 310, an upward revolving speed of the eccentric part 320 is slowed down as the eccentric part 320 approaches to the top dead center by the first elastic member 410 that provides a restoring force to an upper surface.

According to this, a compression rate of the refrigerant is reduced, to prevent the overcompression loss from taking place. This is because the overcompression loss is proportional to square of a piston upward moving speed (piston upward moving speed)$^2$.

Referring to FIG. 3B, if the piston 340 comes to the top dead center by the foregoing process, a power of the torque stored in the first elastic member 410 is the greatest.

If an explosion of the compressed refrigerant gas is made under above state, to discharge the refrigerant gas, and move the piston 340 connected to the connecting rod 330 down by successive rotation of the crank shaft 310 and revolution of the eccentric part 320 as shown in FIG. 3C, the first elastic member 410 acts such that a faster revolution of the eccentric part 320 is made by using the stored torque as the first elastic member 410 is restored by the restoring force. Therefore, the piston 340 moves down faster in a re-expansion process, to draw the refrigerant, more smoothly.

Figure 5A:
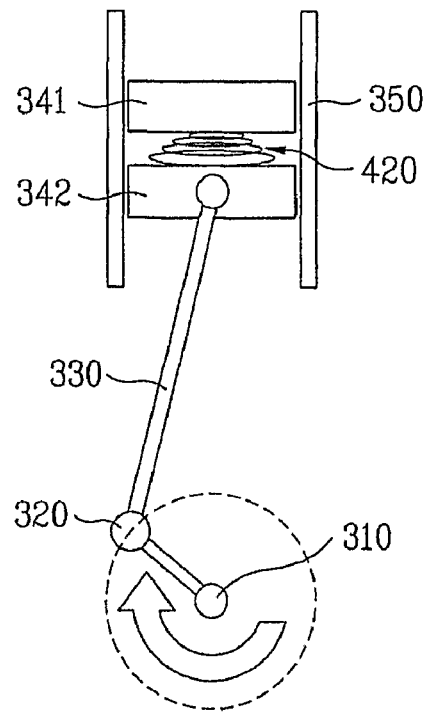
FIGS. 5A~5C illustrate diagrams showing the steps of operation of a structure in accordance with a second preferred embodiment of the present invention, schematically.
Figure 5B:
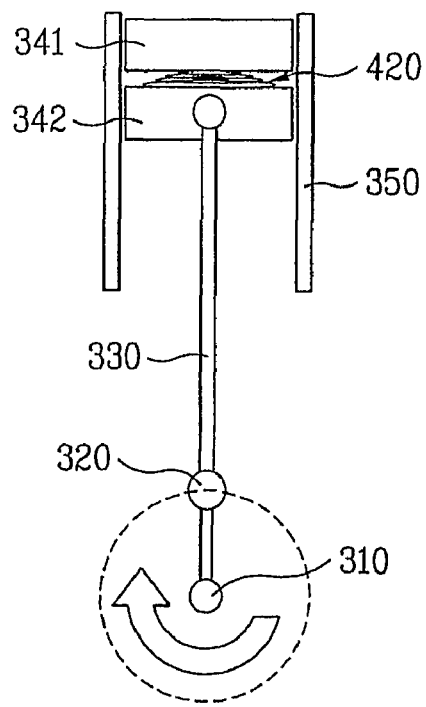
Figure 5C:
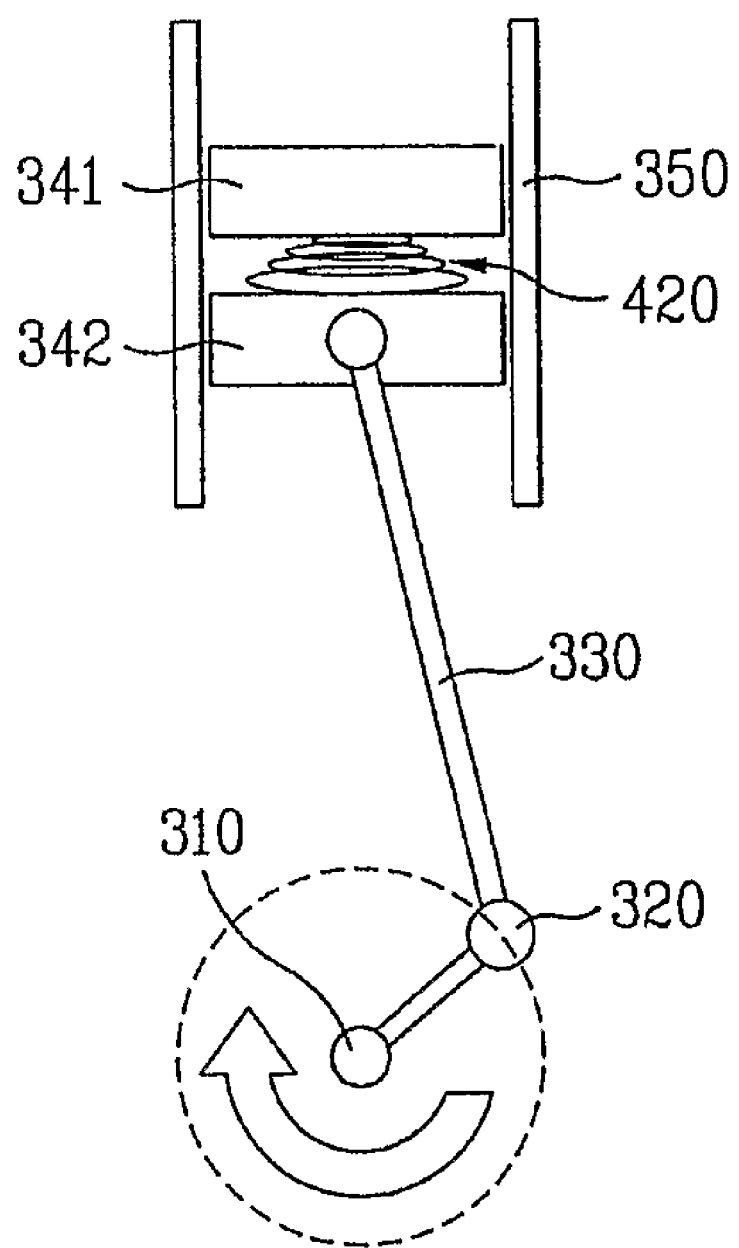

FIGS. 5A~5C illustrate diagrams showing the steps of operation of a structure in accordance with a second preferred embodiment of the present invention, schematically.

That is, the second embodiment of the present invention suggests fitting a supplementary torque providing part in the piston 340. For this, the piston 340 includes a first piston 341, and a second piston 342, and the supplementary torque providing part is provided between the pistons 341 and 342, with both ends thereof connected to the pistons 341 and 342.

The supplementary toque providing part includes a second elastic member 420 which is compressed when the refrigerant is compressed, and restored when the refrigerant is drawn. The supplementary torque providing part 420 is either a coil spring, or a plate spring.

Particularly, as shown, the second embodiment suggests the second elastic member 420 to be a conical coil spring that has a diameter which becomes the greater as it goes toward a side connected to the connected rod 330 the more.

Of course, the piston 340 may include, not only two pieces of pistons 341, and 342, but also a plurality of pieces of pistons, more than three, when the second elastic member 420 is provided between each of adjacent piston pieces.

The connecting rod 330 is connected to the second piston 342 positioned in a lowest part of the drawing when the drawing is seen from above, and the first piston 341 moves along with the second elastic member 420.

The second elastic member 420 is connected to the pistons 341 and 342 with a fastening member 421, such as a bolt, a screw, welding, or a rivet, or hooks (not shown) on opposite surfaces of the pistons 341 and 342 to which ends of the second elastic member 420 are hooked.

The operation of the second embodiment compressor will be described in more detail with reference to FIGS. 5A and 5C.

The operation of the first embodiment compressor will be described in more detail referring to FIGS. 3A~3C, which illustrate the steps of operation of the first embodiment compressor.

When power is applied to the compressor for operation of the compressor, the rotor 22 rotates together with the crank shaft 310. Then, the eccentric part 320 at the end of the crank shaft 310 eccentric therefrom revolves round the axis of the crank shaft 310, to make the connecting rod 330 to reciprocate.

According to this, the piston 340 reciprocates inside of the cylinder block 350, to repeat a series of process in which the refrigerant is drawn into the cylinder block 350, compressed, and discharged.

In above process, referring to FIG. 5A, for compressing the refrigerant introduced thereto, if the piston 340 moves upward from a lowest position little by little, the second elastic member 420 between the pistons 341 and 342 is compressed little by little and stores an amount of torque.

In this instance, even though the eccentric part 320 is revolved by the rotation of the crank shaft 310, an upward revolving speed of the eccentric part 320 is slowed down as the eccentric part 320 approaches to the top dead center by the second elastic member 420 that provides a restoring force to an upper surface.

Until the second elastic member 420 is compressed fully when the power transmitted to the first piston is transmitted to the second piston 342 fully, an upward moving speed of the first piston 341 is slower than the upward moving speed of the second piston 342. According to this, the refrigerant compression rate drops in the compression, to prevents the overcompression loss from taking place.

Referring to FIG. 5B, if the piston 340 comes to the top dead center in the foregoing process, a power of the torque stored in the second elastic member 420 is the greatest.

If an explosion of the compressed refrigerant gas is made under above state, to discharge the refrigerant gas, and move the piston 340 connected to the connecting rod 330 down by successive rotation of the crank shaft 310 and revolution of the eccentric part 320 as shown in FIG. 5C, the second elastic member 420 acts such that a faster revolution of the eccentric part 320 is made by using the stored torque as the second elastic member 420 is restored by the restoring force. Therefore, the piston 340 moves down faster in a re-expansion process, to draw the refrigerant, more smoothly.

Figure 6A:
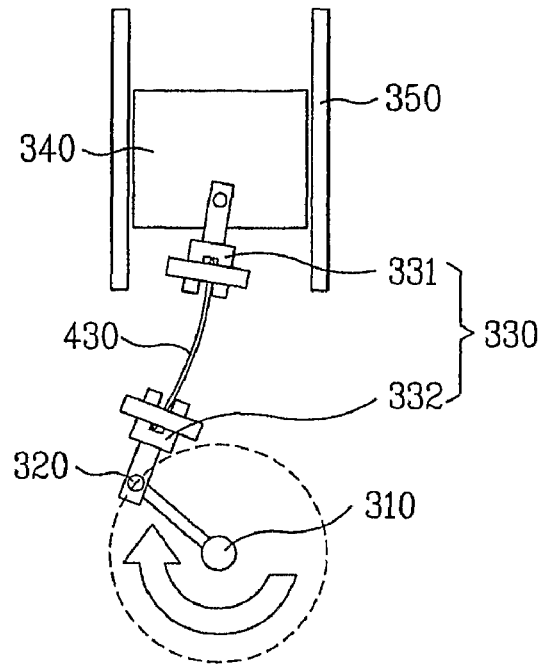
FIGS. 6A~6C illustrate diagrams showing the steps of operation of a structure in accordance with a third preferred embodiment of the present invention, schematically.
Figure 6B:
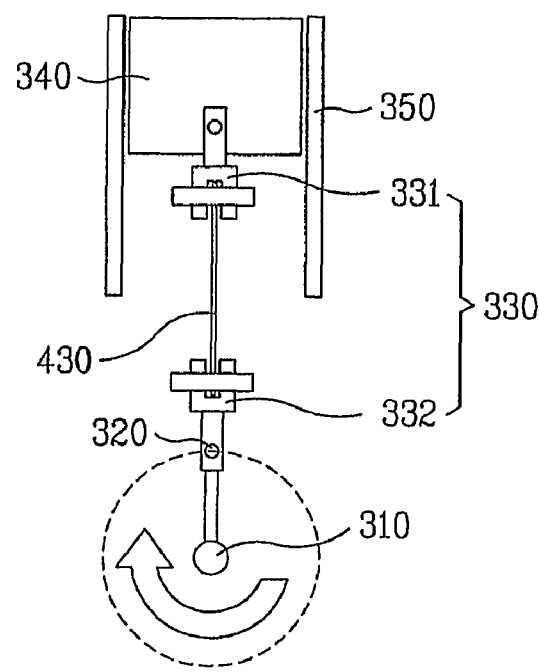
Figure 6C:
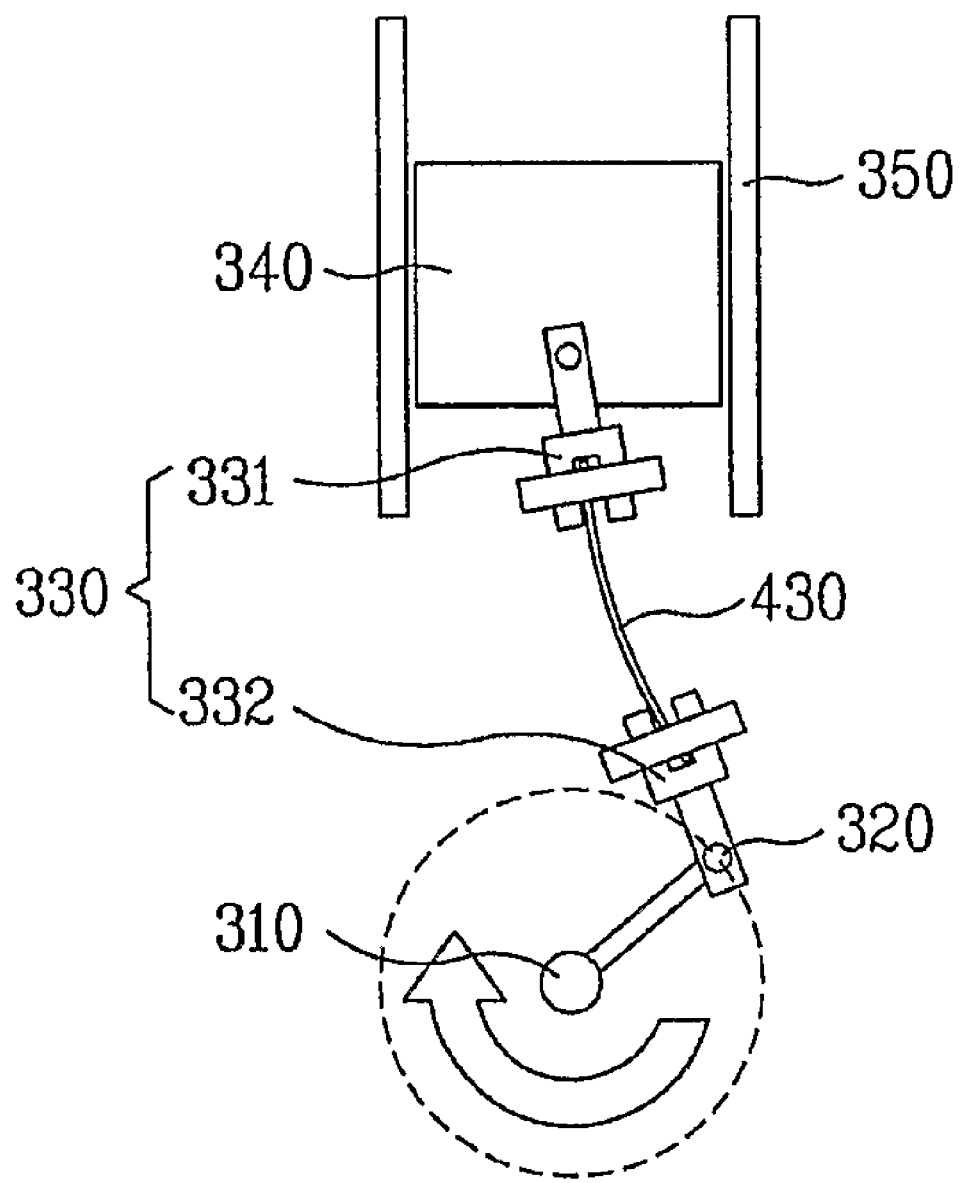

Referring to FIGS. 6A~6C, a third embodiment suggests providing the supplementary torque providing part to the connecting rod 330.

For this, the connecting rod 330 is divided into a first connecting part 331 and a second connecting part 332, and the supplementary torque providing part is provided between the first connecting part 331 and the second connecting part 332. The first connecting part 331 is connected to the piston part 340, and the second connecting part 332 is connected to the eccentric part 320.

Moreover, the supplementary torque providing part includes at least one third elastic member 430 having opposite ends connected to opposite surfaces of the first connecting part 331 and the second connecting part 332. The third elastic member 430 is a plate spring, and connected to the connecting parts 331 and 332 with at least one of joining type, selected from bolt, screw, rivet, and welding.

That is, referring to FIG. 6A, in the third embodiment of the present invention, since the connecting rod 330 is bent at the third elastic member 430, to reduce the upward moving speed of the piston 340, the loss caused by the overcompression can be prevented. That is, the upward moving speed of the piston 340 is reduced as much as an amount of bending of the third elastic member 430.

Then, referring to FIG. 6B, there is no bending of the third elastic member 430 at the top dead center of the piston, when the third elastic member 430 is restored completely.

Then, referring to FIG. 6C, alike in compression, the third elastic member 430 is bent to a certain amount in the re-expansion, to maintain the piston 340 to stay in the vicinity of the top dead center, until the eccentric part 320 revolves more than a certain angle when the third elastic member 430 is restored to make the piston 340 to move downward faster than before, that enables an easy drawing of the refrigerant.

The upward, and downward moving speeds of the piston 340 in the refrigerant compression and re-expansion can be adjusted by using a spring constant of the third elastic member 430.

Moreover, the reduction of lateral component (X-axis) force, the connecting rod 330 applies to the piston 340 in the compression, provides an advantage that a friction force between an outside side surface of the piston 340 and an inside side surface of the cylinder block 350 is reduced.

Figure 7A:
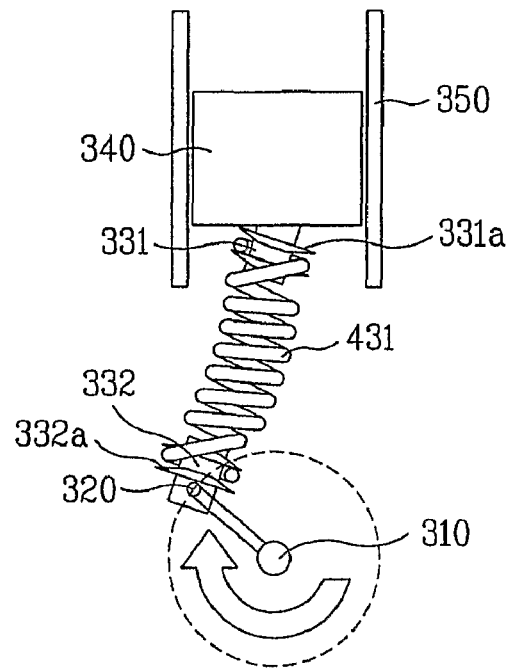
FIGS. 7A~7C illustrate diagrams showing the steps of operation of a structure in accordance with a fourth preferred embodiment of the present invention, schematically.
Figure 7B:
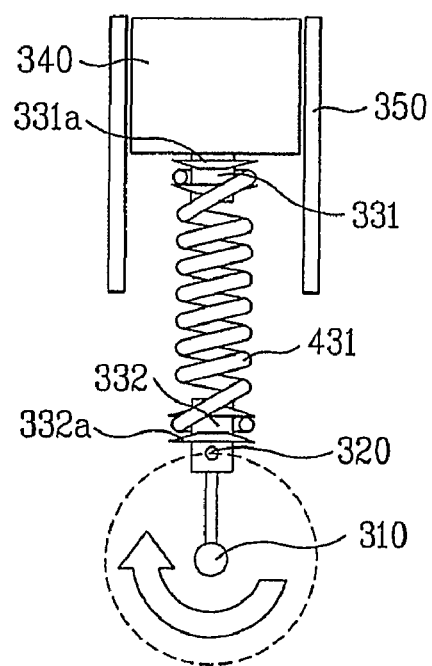
Figure 7C:
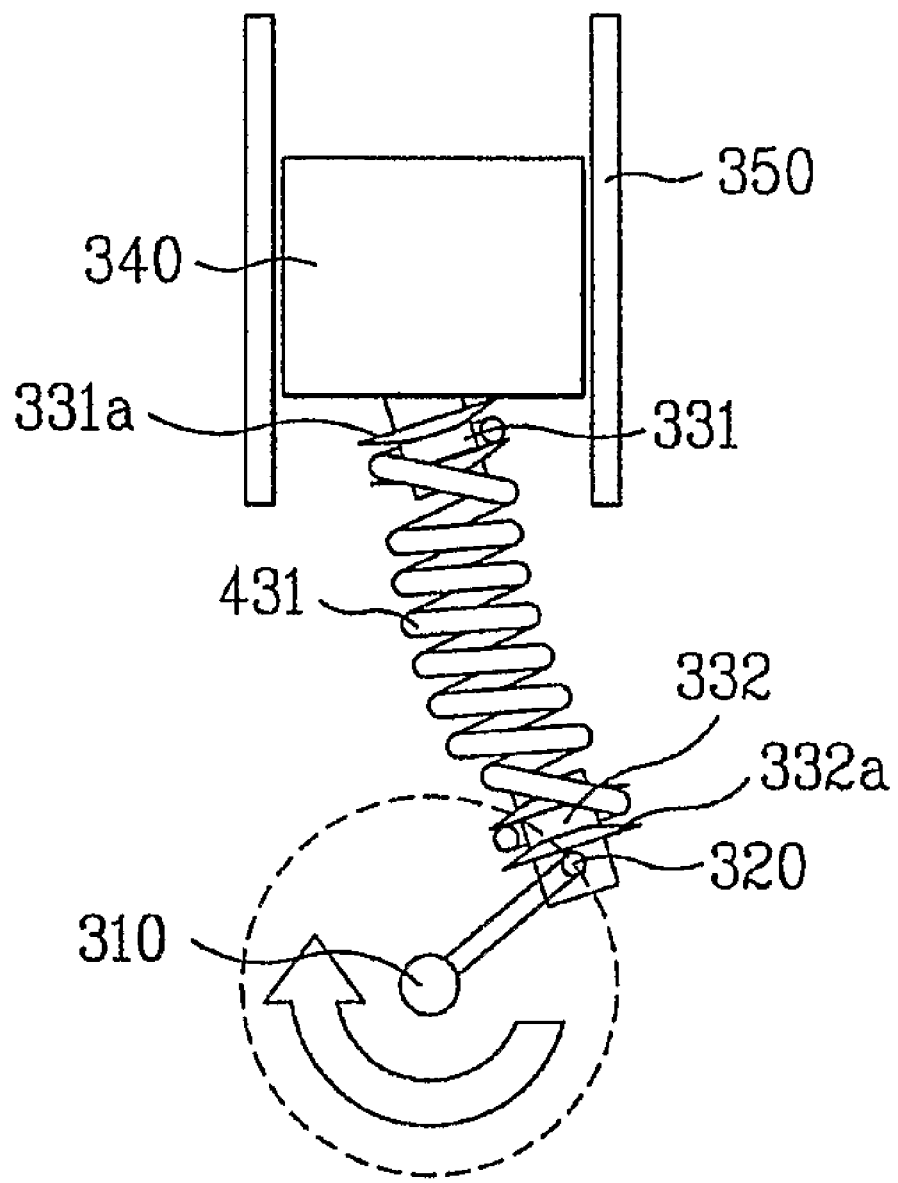

FIGS. 7A~7C illustrate diagrams each showing a system in accordance with a fourth preferred embodiment of the present invention.

That is, the fourth embodiment of the present invention suggests the third elastic member of the supplementary torque providing part in the third embodiment being a coil spring 431. The coil spring 431 may be cylindrical with a same diameter on the whole, or conical with a diameter that becomes the greater as it goes downward the more.

If the third elastic member is the coil spring 431, the coil spring 431 is connected to the connecting parts 331 and 332 by forming projections 331a and 332a on outside circumferences in length directions thereof respectively, and holding both ends of the coil spring 431 with the projections 331a, and 332a. Above connecting structure permits to prevent breaking away of the coil spring 431 following bending of the coil spring 431.

Particularly, the projection 331a or 332a may have a thread, or at least two projections. The at least two projections may respectively be outwardly sloped as projections 331a and 332a go toward an outer side from the connecting parts, so that engagement of the coil spring 431 between the projections is easy while disengagement therefrom is prevented.

Of course, the connection between the connecting parts 331 and 332 of the connecting rod 330 and the coil spring may be made with bolts, screws, rivets, welding, and the like.

According to this, referring to FIG. 7A, since a part of the coil spring 431 is bent in compression of the refrigerant, the upward moving speed of the piston 340 is reduced comparatively, to prevent a loss caused by overcompression, and as shown in FIG. 7B, bending of the coil spring 431 does not occur at the top dead center.

Thereafter, referring to FIG. 7C, since the coil spring 431 is restored in the re-expansion such that the coil spring 431 moves the piston 340 downward at a fast speed, drawing of the refrigerant is easy.

Figure 8A:
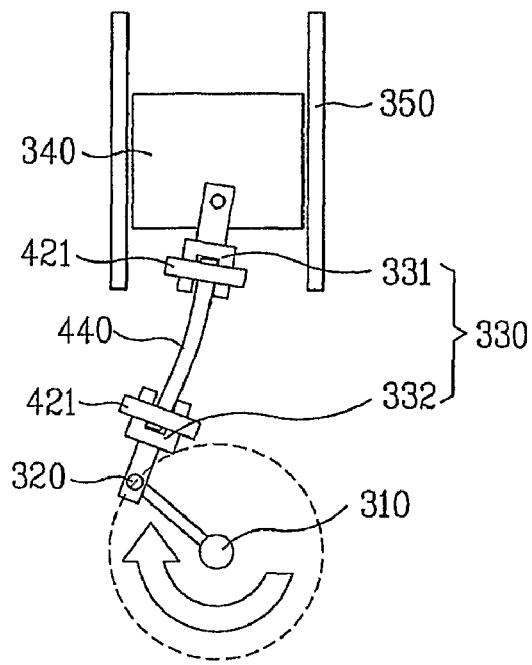
FIGS. 8A~8C illustrate diagrams showing the steps of operation of a structure in accordance with a fifth preferred embodiment of the present invention, schematically.
Figure 8B:
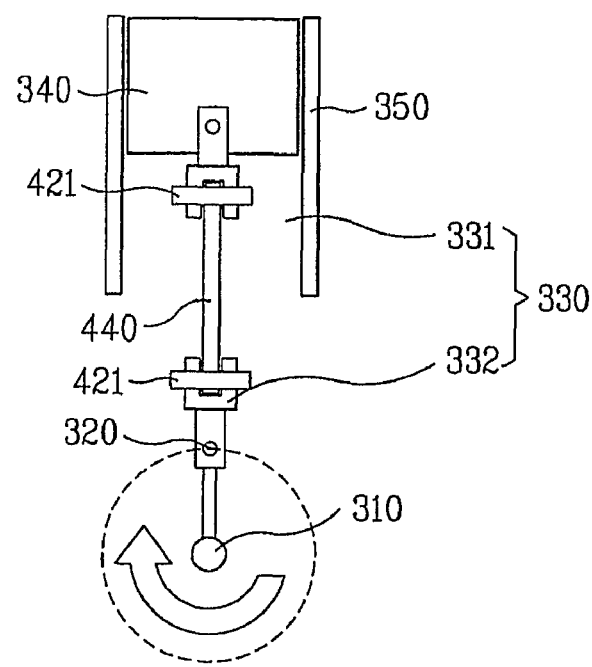
Figure 8C:
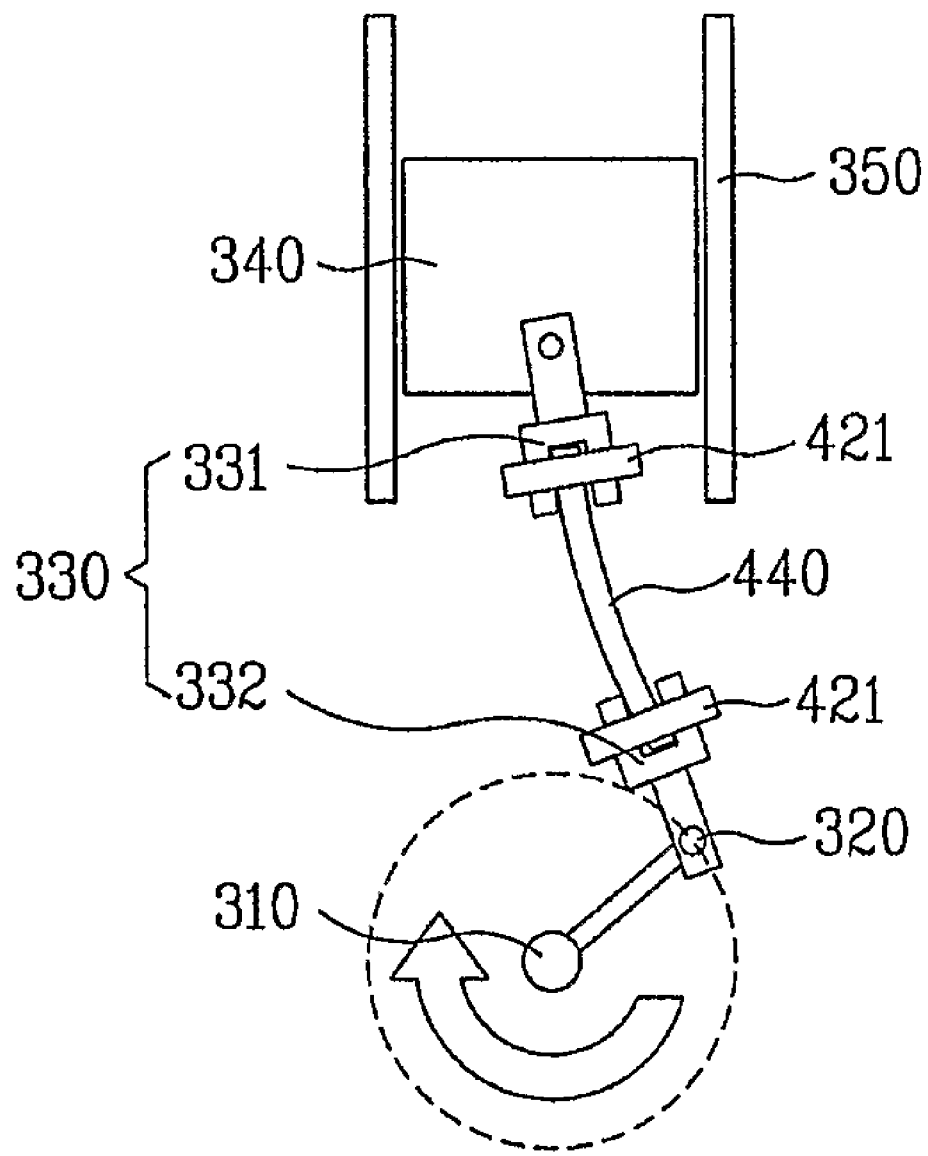

In the meantime, FIGS. 8A~8C illustrate diagrams each showing a system of a fifth preferred embodiment of the present invention.

The fifth embodiment of the present invention suggests the supplementary torque providing part in the third embodiment of the present invention of being a bar, or a plate of a flexible material other than a metal.

The supplementary torque providing part 440 of the flexible material and the connecting parts 331 and 332 may be joined with at least one of joining types selected from joining with fastening member 421 such as bolt, screw, rivet, or welding.

Referring to FIG. 8A, alike the system of the third embodiment of the present invention, in the system of the fifth embodiment of the present invention, an upward moving speed of the piston 340 is reduced as the flexible supplementary torque providing part 440 is bent in compression of the refrigerant, to reduce a loss caused by overcompression.

In succession, referring to FIG. 8B, since the flexible supplementary torque providing part 440 is straightened at the top dead center, and as shown in FIG. 8C, the flexible supplementary torque providing part 440 is bent such that the piston 340 move at a fast speed in the re-expansion, drawing of the refrigerant can be easy.

Figure 9A:
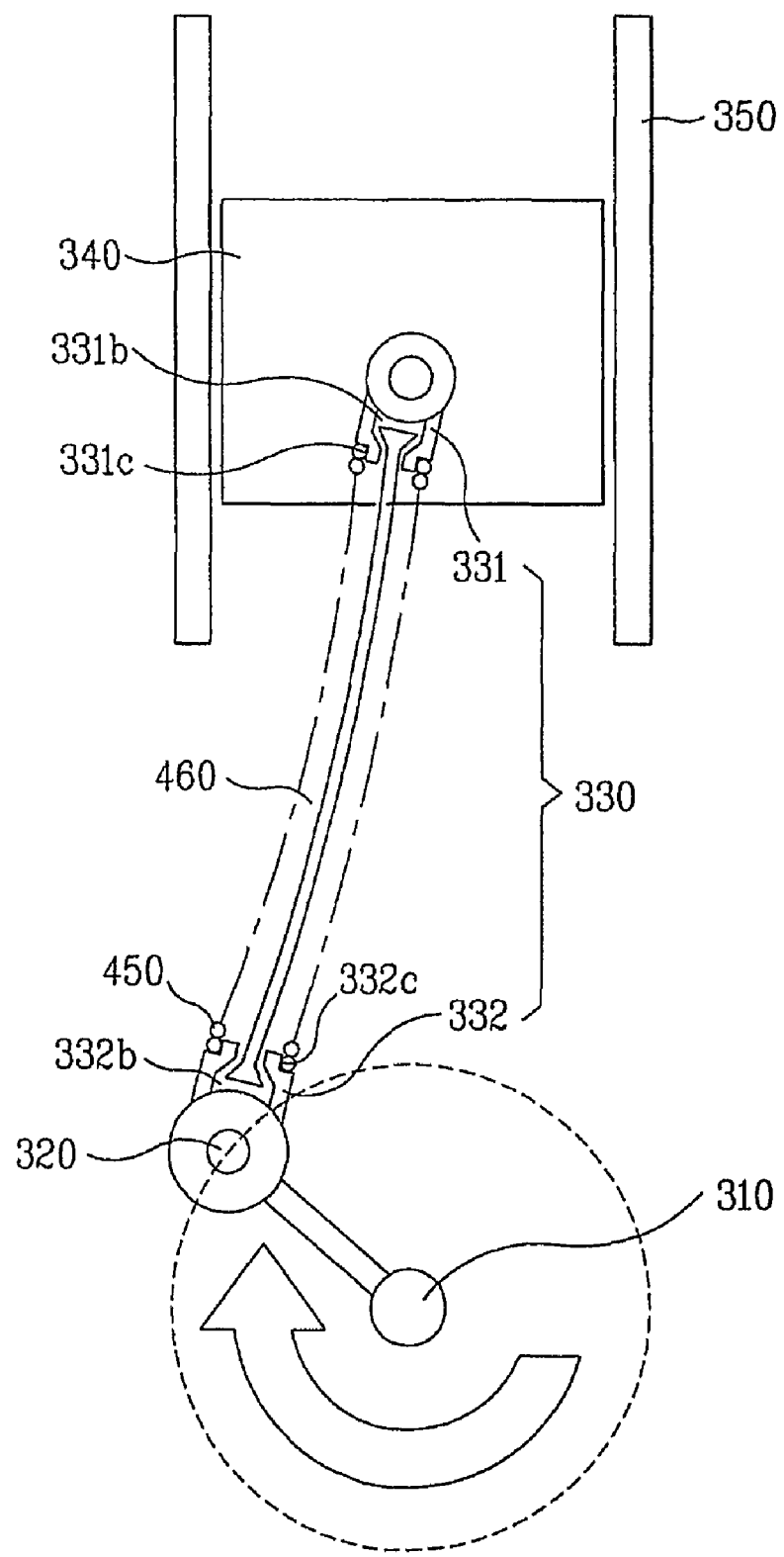
FIGS. 9A~9C illustrate diagrams showing the steps of operation of a structure in accordance with a sixth preferred embodiment of the present invention, schematically.
Figure 9B:
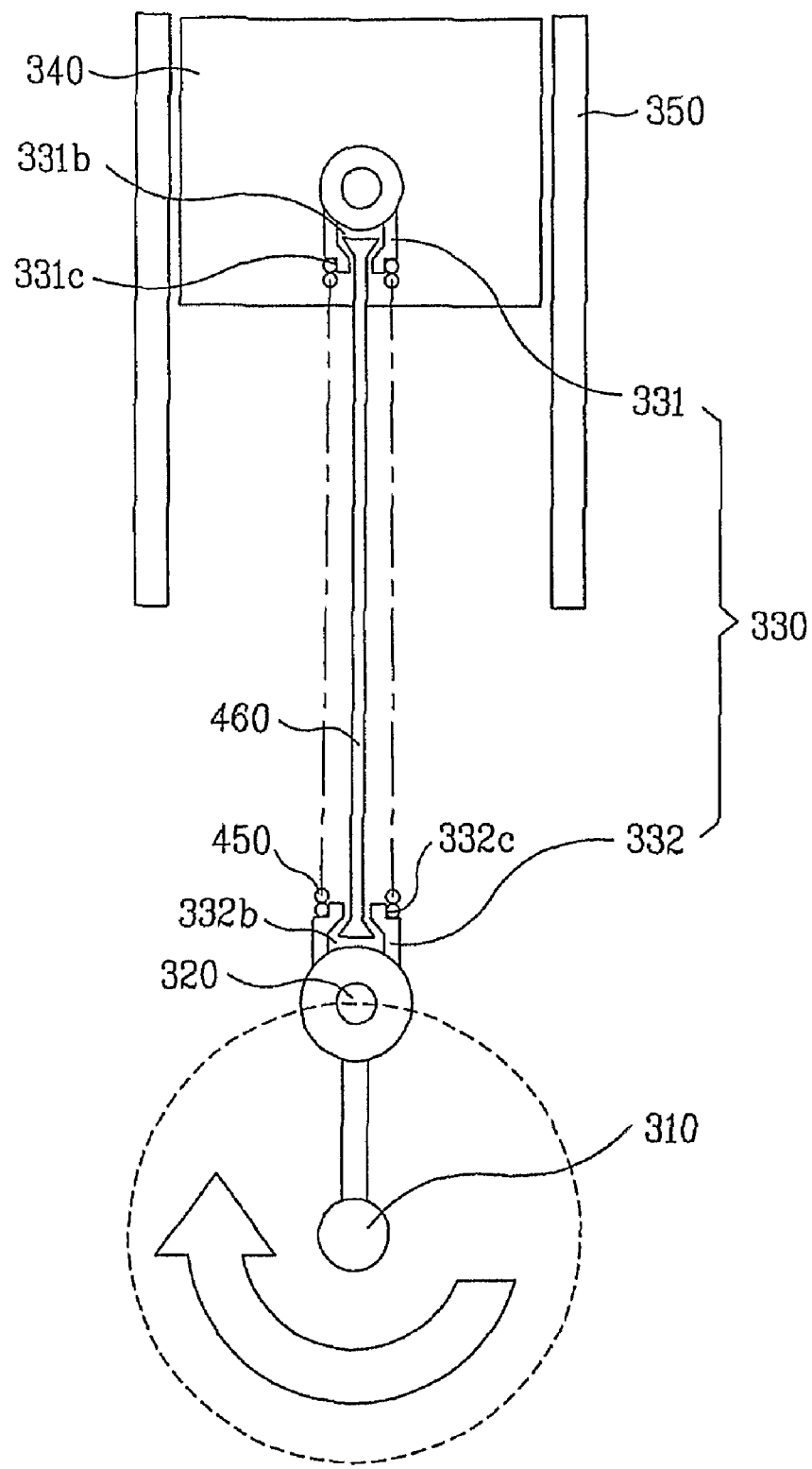
Figure 9C:
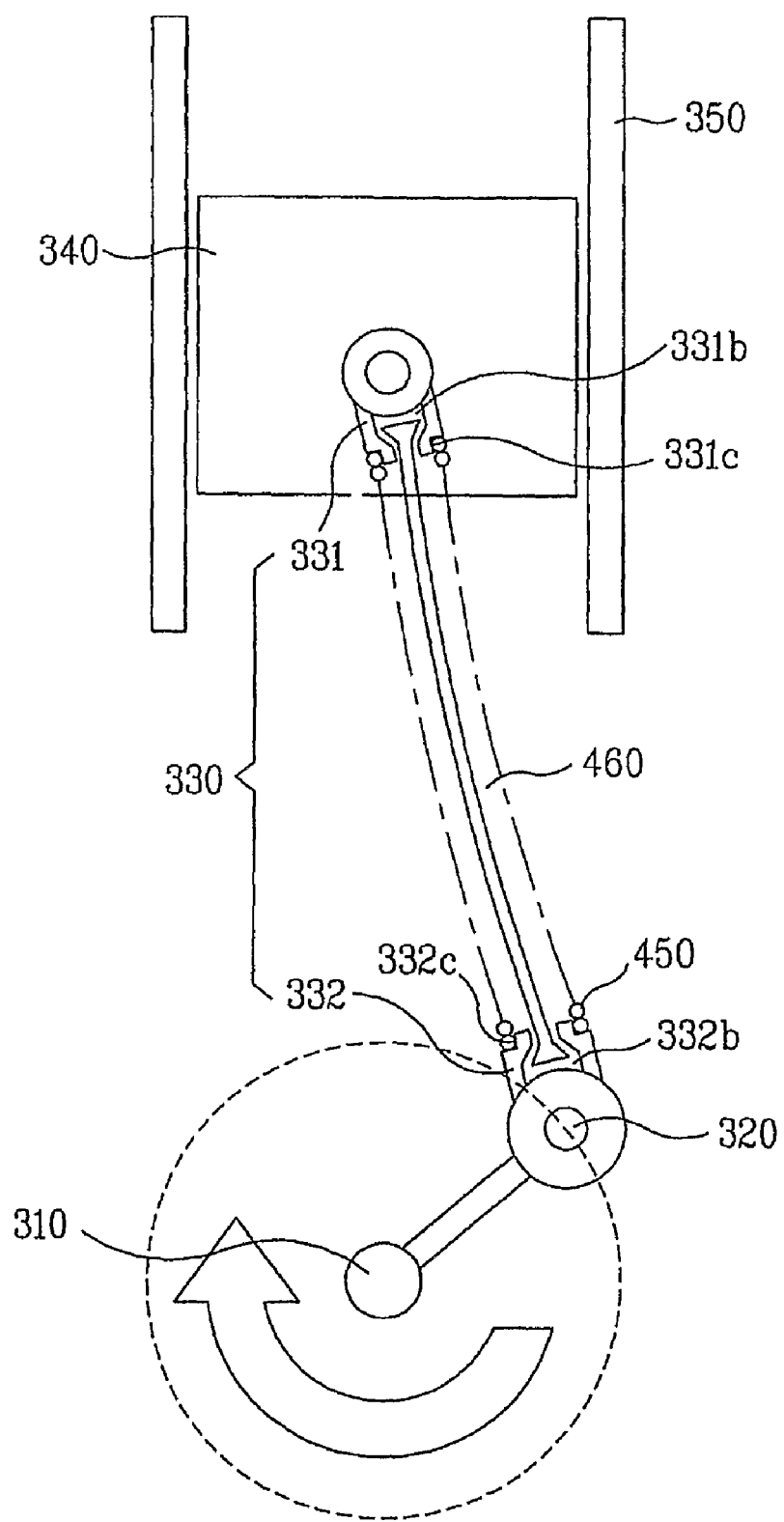

In the meantime, FIGS. 9A~9C illustrate diagrams each showing a system of a sixth preferred embodiment of the present invention.

The sixth embodiment of the present invention suggests the supplementary torque providing part provided to the connecting rod 330 including a fourth elastic member 450 and a fifth elastic member 460. Alike the third embodiment, the connecting rod 330 is divided into a first connecting part 331 and a second connecting part 332.

The fourth elastic member 450 forms an outer circumferential surface in a state opposite ends thereof are connected to the first connecting part 331 and the second connecting part 332 respectively, and the fifth elastic member 460 is fitted inside of the fourth elastic member 450.

There are a first holder 331b and a second holder 332b in opposite surfaces of the first connecting part 331 and the second connecting part 332 each having an inner space larger than an entrance, and the fifth elastic member 460 has opposite big ends 461 to be held in the first and second holders 331b and 332b.

The inside space of the holder 331b or 332b is greater than a diameter of the big end 461 by a certain amount of gap. The certain amount of gap restricts a length of a bending moment caused by bending of the fourth elastic member 450 in compression of the refrigerant, restricts variation of a length deformed in pulling the fourth elastic member 450 in re-expansion and suction of the refrigerant.

In above structure, the fourth elastic member 450 is a coil spring, and the fifth elastic member 460 is a flexible bar or a metal plate spring, or a coil spring. If the fourth elastic member 450 is a coil spring, the first, and second holders 331b and 332b have fitting steps 331c and 332c in ends thereof.

Of course, alike the fourth embodiment, though a thread or a plurality of projections may be formed at an end of the holders 331b and 332b, for stable fitting to the coil spring, or bolt, screw, rivet, or welding may be used for the stable fitting, since the fifth elastic member 460 always maintains a distance between the connecting parts 331 and 332 in the sixth embodiment, simple insertion of the fourth elastic member 450 into the fitting steps 331c, and 332c can prevent break away of the fourth elastic member 450.

Therefore, referring to FIG. 9A, as a force that pushes up the piston 340 in the refrigerant compression is provided to the fourth elastic member 450, the fourth elastic member 450 as well as the fifth elastic member 460 bend, and relative to this, the upward moving speed of the piston part 340 is delayed as much as a time period (a time period the fourth, and fifth elastic member 450 and 460 bend), to prevent a loss caused by overcompression.

Moreover, as shown in FIG. 9B, since the connecting rod 330 does not bend at a top dead center, and as shown in FIG. 9C, the fourth elastic member 450 and the fifth elastic member 460 bend a little in the re-expansion as the fourth elastic member 450 and the fifth elastic member 460 are restored in the re-expansion, to provide a force that makes the piston 340 move down at a fast speed, the suction of the refrigerant becomes more easy.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The compressor of the present invention reduces a refrigerant compression rate in a refrigerant compression process by means of a supplementary torque providing part. According to this, the overcompression loss of the refrigerant can be reduced to the maximum. Moreover, the supplementary torque providing part provides a time delay at the top dead center, which permits a reduction of torque of the electric driving part.

Moreover, the supplementary torque providing part permits the piston to move down at a fast speed in re-expansion, to make suction of the refrigerant easier.

The supplementary torque providing part in accordance with either of the third to sixth preferred embodiment of the present invention reduces an X-axis direction component of the force applied to a side of the piston in compression of the refrigerant, to reduce a friction force of the piston, that reduces wear of the piston, or an inside surface of the cylinder block.

What is claimed is:

1. A compressor, comprising:
a cylinder block that compresses, discharges, and draws refrigerant;
a piston that reciprocates inside of the cylinder block;
a crank shaft that rotates as the crank shaft receives a torque from an electric driving part, the crank shaft having an eccentric part at an end thereof;
a connecting rod having one end coupled to the piston and another end coupled to the eccentric part at the crank shaft, that converts a rotating movement of the crank shaft into a linear movement that moves the piston; and a supplementary torque providing part, wherein the connecting rod includes a first connecting part connected to the piston and a second connecting part connected to the eccentric part at the crank shaft, and wherein the supplementary torque providing part includes a first elastic member provided between the first connecting part and the second connecting part, and having opposite ends connected to the first connecting part and the second connecting part, respectively, to form an outer circumferential surface, and a second elastic member fitted inside of the first elastic member, wherein the first and second elastic members are bent in compression and re-expansion of the refrigerant.

2. The compressor as claimed in claim 1, wherein the first connecting part and the second connecting part include a first holder and a second holder, respectively, at opposite surfaces thereof, and the second elastic member includes enlarged ends at opposite ends thereof that prevent breaking away of the second elastic member when the enlarged ends are held in the first and second holders, respectively.

3. The compressor as claimed in claim 2, wherein the first holder and the second holder include spaces formed larger than the enlarged ends that respectively hold the enlarged ends.

4. The compressor as claimed in claim 3, wherein the first holder and the second holder include spaces formed larger than a diameter of the enlarged ends.

5. The compressor as claimed in claim 4, wherein the first holder and the second holder include spaces formed larger than a diameter of the enlarged ends by a certain amount, thereby leaving a predetermined gap between the enlarged ends and the first holder and the second holder, respectively.

6. The compressor as claimed in claim 2, wherein the first holder and the second holder include fitting steps configured to receive the first elastic member, respectively.

7. The compressor as claimed in claim 2, wherein the first second elastic member includes at least one of a flexible bar or a flexible plate.

8. The compressor as claimed in claim 2, wherein the second elastic member includes at least one plate spring.

9. The compressor as claimed in claim 2, wherein the first and second connecting parts of the connecting rod are connected to the second elastic member by a fastening member.

10. The compressor as claimed in claim 9, wherein the fastening member comprises a bolt, a screw, or a rivet.

11. The compressor as claimed in claim 2, wherein the first and second connecting parts of the connecting rod are connected to the second elastic member by welding.

12. The compressor as claimed in claim 1, wherein the first elastic member is a coil spring.

13. The compressor as claimed in claim 12, wherein the coil spring is connected to the first and second connecting parts of the connecting rod by forming at least two projections on outside surfaces of the first and second connecting parts along a length direction thereof respectively, and holding opposite ends of the coil spring between the projections.

14. The compressor as claimed in claim 1, wherein the first elastic member is connected to the first and second connecting parts of the connecting rod by forming a plurality of projections on outside surfaces of the first and second connecting parts along a length direction thereof, respectively, and wherein opposite ends of the first elastic member are held between the plurality of projections.

* * * * *